United States Patent
Mossman et al.

(10) Patent No.: US 8,298,719 B2
(45) Date of Patent: Oct. 30, 2012

(54) PASSIVE RECOVERY OF LIQUID WATER PRODUCED BY FUEL CELLS

(75) Inventors: Alex Mossman, Vancouver (CA); Brian Wells, Vancouver (CA); Russell Barton, New Westminster (CA); Henry Voss, West Vancouver (CA)

(73) Assignee: University of North Florida Board of Trustees, Jacksonville, FL (US)

( * ) Notice: Subject to any disclaimer, the term of this patent is extended or adjusted under 35 U.S.C. 154(b) by 1362 days.

(21) Appl. No.: 11/936,048

(22) Filed: Nov. 6, 2007

(65) Prior Publication Data
US 2008/0241623 A1 Oct. 2, 2008

Related U.S. Application Data

(60) Provisional application No. 60/864,767, filed on Nov. 7, 2006, provisional application No. 60/969,890, filed on Sep. 4, 2007.

(51) Int. Cl.
*H01M 8/10* (2006.01)
(52) U.S. Cl. ........ 429/481; 429/480; 429/482; 429/492; 429/491
(58) Field of Classification Search .......... 429/481, 429/480, 482, 492, 491
See application file for complete search history.

(56) References Cited

U.S. PATENT DOCUMENTS

| | | | |
|---|---|---|---|
| 6,413,663 B1 | 7/2002 | Mercuri | |
| 6,413,671 B1 | 7/2002 | Mercuri | |
| 6,451,470 B1 | 9/2002 | Koschany et al. | |
| 6,460,733 B2 | 10/2002 | Acker et al. | |
| 6,464,880 B1 | 10/2002 | Datta et al. | |
| 6,566,003 B2 | 5/2003 | Acker | |
| 6,589,679 B1 | 7/2003 | Acker et al. | |
| 6,590,370 B1 | 7/2003 | Leach | |
| 6,632,553 B2 | 10/2003 | Corey et al. | |
| 6,645,655 B1 | 11/2003 | McNamee et al. | |
| 6,686,081 B2 | 2/2004 | Gottesfeld | |
| 6,699,021 B2 | 3/2004 | McNamee et al. | |
| 6,737,181 B2 | 5/2004 | Beckmann et al. | |
| 6,761,988 B1 | 7/2004 | Acker et al. | |
| 6,794,071 B2 | 9/2004 | Beckmann et al. | |
| 6,808,837 B2 | 10/2004 | Hirsch | |
| 6,808,838 B1 | 10/2004 | Wilson | |
| 6,821,658 B2 | 11/2004 | Acker et al. | |
| 6,824,899 B2 | 11/2004 | Acker et al. | |
| 6,824,900 B2 | 11/2004 | DeFilippis | |
| 6,866,952 B2 | 3/2005 | Corey et al. | |
| 6,869,716 B2 | 3/2005 | Neutzler | |
| 6,890,674 B2 | 5/2005 | Beckmann et al. | |

(Continued)

FOREIGN PATENT DOCUMENTS
EP 1355370 10/2003
(Continued)

*Primary Examiner* — Helen O Conley
(74) *Attorney, Agent, or Firm* — Thomas C. Saitta

(57) ABSTRACT

Passive recovery of liquid water from the cathode side of a polymer electrolyte membrane through the design of layers on the cathode side of an MEA and through the design of the PEM, may be used to supply water to support chemical or electrochemical reactions, either internal or external to the fuel cell, to support the humidification or hydration of the anode reactants, or to support the hydration of the polymer electrolyte membrane over its major surface or some combination thereof. Such passive recovery of liquid water can simplify fuel cell power generators through the reduction or elimination of cathode liquid water recovery devices.

6 Claims, 8 Drawing Sheets

U.S. PATENT DOCUMENTS

| | | |
|---|---|---|
| 6,890,680 B2 | 5/2005 | Beckmann et al. |
| 6,908,701 B2 | 6/2005 | Corey et al. |
| 6,936,368 B2 | 8/2005 | Hirsch et al. |
| 6,981,877 B2 | 1/2006 | Ren et al. |
| 6,991,865 B2 | 1/2006 | Acker et al. |
| 7,060,384 B2 | 6/2006 | Yoshida et al. |
| 7,081,310 B2 | 7/2006 | DeFilippis |
| 7,125,620 B2 | 10/2006 | Acker et al. |
| 7,128,106 B2 | 10/2006 | Becerra et al. |
| 7,131,190 B2 | 11/2006 | Brown et al. |
| 7,175,934 B2 | 2/2007 | DeFilippis et al. |
| 7,179,501 B2 | 2/2007 | Beckmann et al. |
| 7,205,059 B2 | 4/2007 | Corey et al. |
| 2003/0165727 A1 | 9/2003 | Priestnall et al. |
| 2003/0180584 A1* | 9/2003 | Suzuki et al. ............. 429/9 |
| 2004/0209133 A1 | 10/2004 | Hirsch et al. |
| 2004/0209136 A1* | 10/2004 | Ren et al. ............. 429/30 |
| 2004/0241531 A1 | 12/2004 | Biegert et al. |
| 2005/0100780 A1 | 5/2005 | Unoki et al. |
| 2005/0170224 A1 | 8/2005 | Ren et al. |
| 2005/0181250 A1 | 8/2005 | Beckmann et al. |
| 2005/0282060 A1 | 12/2005 | DeFillippis et al. |
| 2006/0263671 A1 | 11/2006 | DeFilippis |
| 2007/0015032 A1 | 1/2007 | DeFilippis et al. |
| 2007/0037029 A1 | 2/2007 | Acker et al. |
| 2007/0128503 A1 | 6/2007 | Brown et al. |
| 2007/0269708 A1 | 11/2007 | Son |

FOREIGN PATENT DOCUMENTS

| | | |
|---|---|---|
| JP | 2004079266 | 3/2004 |
| JP | 2006216470 | 8/2006 |
| WO | WO 02/45196 | 6/2002 |
| WO | WO 02/093675 | 11/2002 |
| WO | WO 02/103832 | 12/2002 |
| WO | WO 03/061047 | 7/2003 |
| WO | WO 03/071627 | 8/2003 |
| WO | WO 03/096445 | 11/2003 |
| WO | WO 2004/032258 | 5/2004 |
| WO | WO 2004/093218 | 10/2004 |
| WO | WO 2004093231 | 10/2004 |
| WO | WO 2004093231 A | 10/2004 |
| WO | WO 2005/050769 | 6/2005 |
| WO | WO 2008079529 A | 7/2008 |

* cited by examiner

Fig 1A – Through-PEM Recovery Method

Fig 1B - Laser Drilled Hole in PEM - Hole in Cross Section

MEA cross section showing laser drilled hole. Exit diameter of hole is 2 microns. Cross section was prepared using epoxy back-fill under vacuum with subsequent polishing; a portion of the hole shows hole partially filled with epoxy

Fig 3 Combination of Cathode Sub-layers

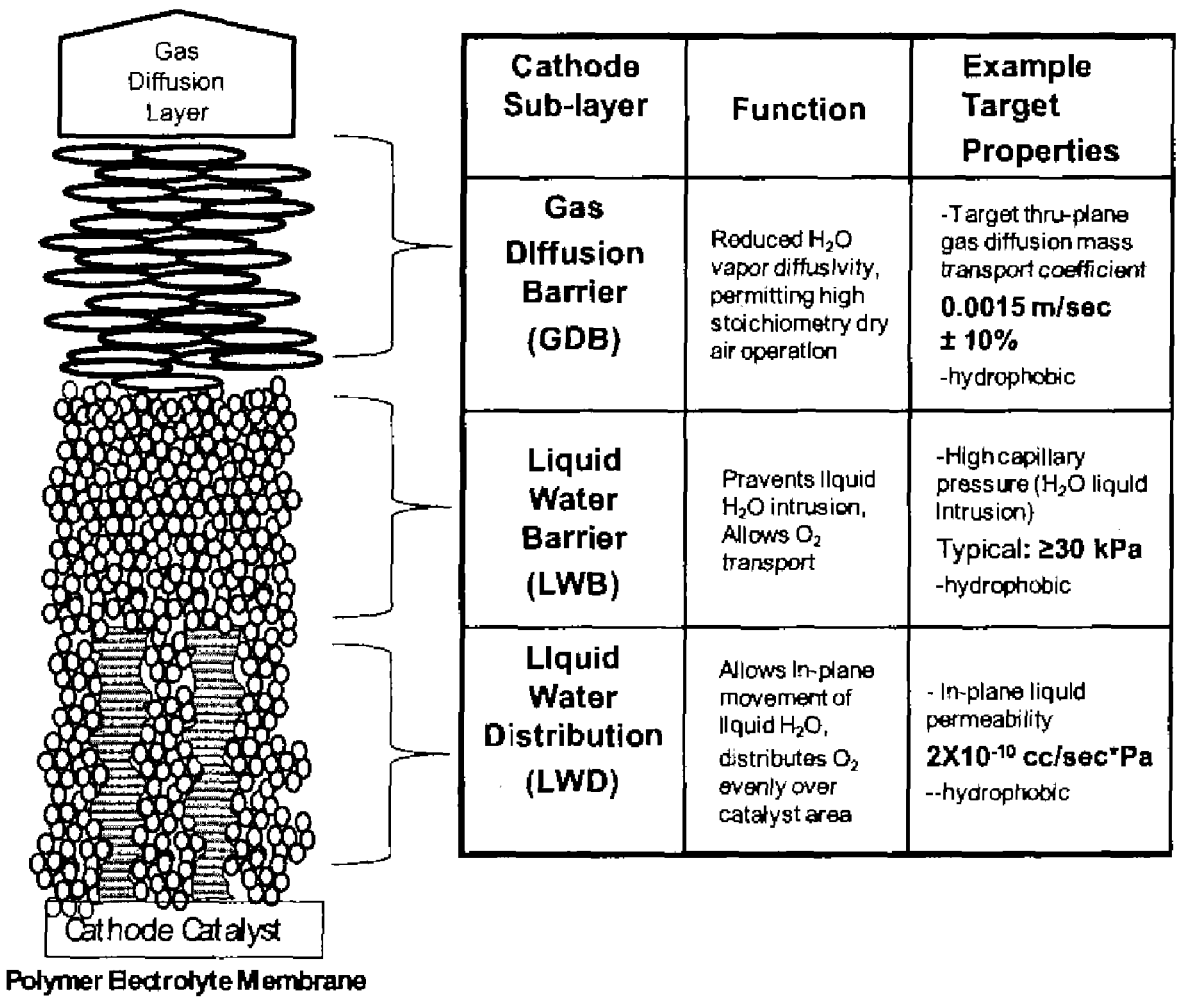

| Cathode Sub-layer | Function | Example Target Properties |
|---|---|---|
| Gas Diffusion Barrier (GDB) | Reduced $H_2O$ vapor diffusivity, permitting high stoichiometry dry air operation | -Target thru-plane gas diffusion mass transport coefficient 0.0015 m/sec ± 10% -hydrophobic |
| Liquid Water Barrier (LWB) | Prevents liquid $H_2O$ intrusion, Allows $O_2$ transport | -High capillary pressure ($H_2O$ liquid intrusion) Typical: ≥30 kPa -hydrophobic |
| Liquid Water Distribution (LWD) | Allows in-plane movement of liquid $H_2O$, distributes $O_2$ evenly over catalyst area | - In-plane liquid permeability $2 \times 10^{-10}$ cc/sec*Pa --hydrophobic |

Figure 4 - Lateral Water Recovery Method

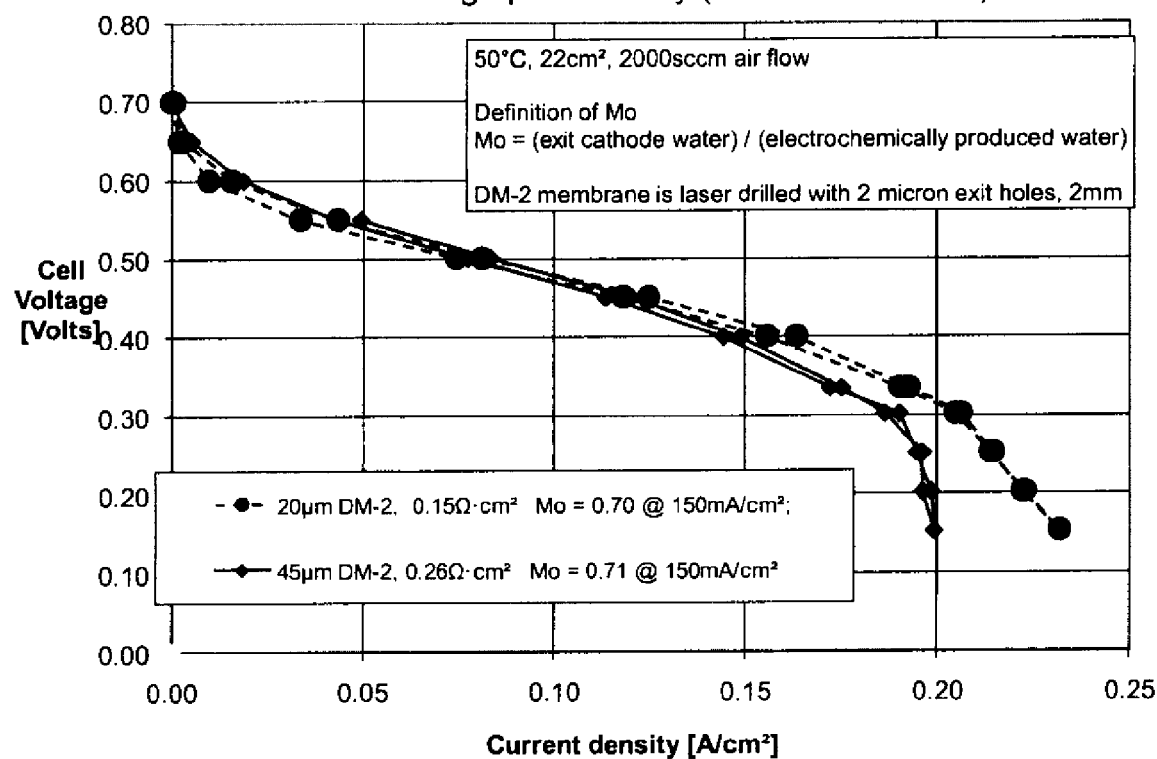
Fig 6 – Performance of Passive Water Recovery MEA using PEM with areas of high permeability (laser drilled holes)

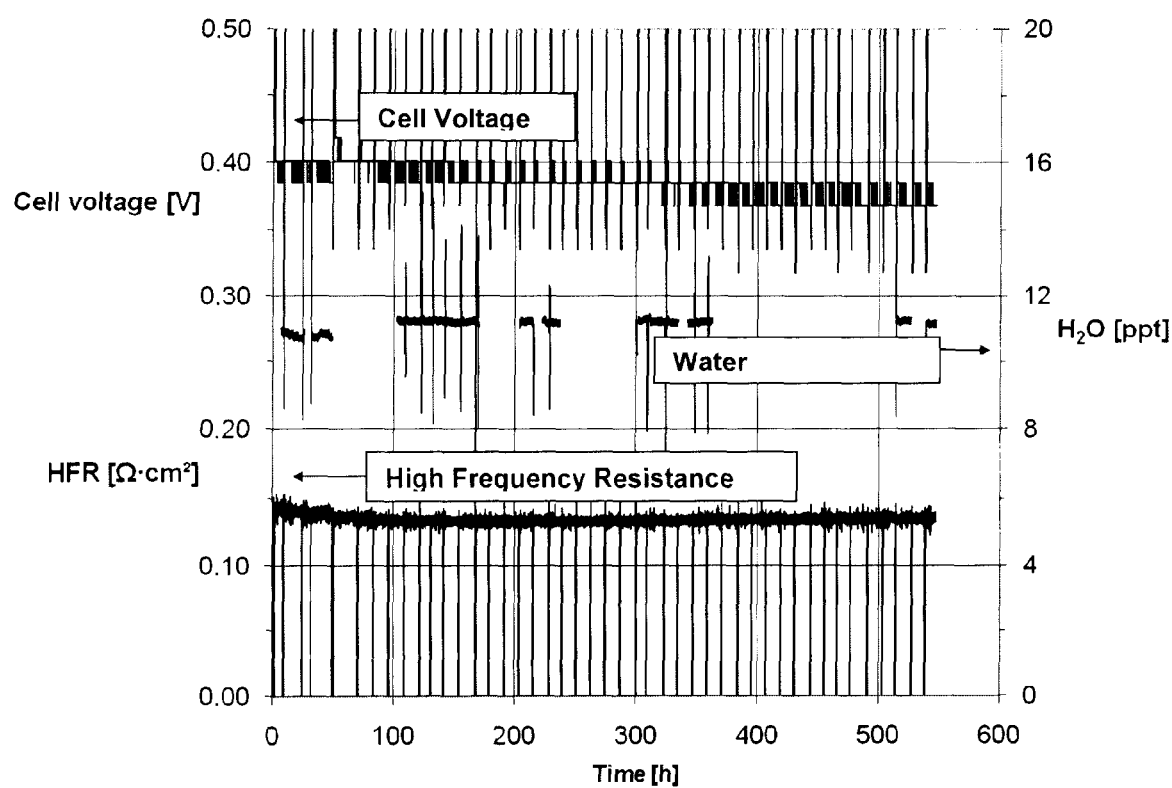
Figure 7 – Durability of Passive Water Recovery MEA

PASSIVE RECOVERY OF LIQUID WATER PRODUCED BY FUEL CELLS

This application claims the benefit of U.S. Provisional Application Ser. Nos. 60/864,767, filed Nov. 7, 2006 and 60/969,890, filed Sep. 4, 2007 under 35 U.S.C. §119(e) and are expressly incorporated herein by reference.

TECHNICAL FIELD

Novel polymer electrolyte membranes and/or cathodes are disclosed which enable the passive recovery of liquid water produced at the cathode of a fuel cell.

BACKGROUND OF THE INVENTION

A well known problem with polymer electrolyte membranes (PEMs) used in fuel cells, such as direct methanol fuel cells (DMFCs), is the recovery of water from the cathode for both hydration of the PEM itself and for re-introduction into the anode fuel reactant stream where in the case of DMFCs, it serves both as a reactant and a dilutant for the methanol fuel. Water is also used as one of the reactant species in the fuel reaction for other types of PEM fuel cells which include those for which there is a reaction external to the fuel cell such as the reforming of hydrocarbon fuels, or those for which a chemical compound is reacted with water to produce hydrogen such as sodium borohydride. Water can also be used to humidify the reactant gas streams which enter the anode compartment of the fuel cell.

The conventional "active" solution to this problem involves putting a condenser and liquid separator on the cathode exhaust stream in order to collect liquid water, which is then metered back into the anode loop.

SUMMARY OF THE INVENTION

It is an object of the invention to recover at least a portion of the water (1) produced in the electrochemical reaction at the cathode, (2) transported to the cathode catalyst layer from the anode with the flow of ions from the anode to the cathode and/or (3) which otherwise is present at the cathode, possibly from the direct oxidation of fuel which diffuses across the PEM from the anode side. This water is sometimes referred to herein as "cathode water". The cathode water can be directed to either the anode itself for reaction or for fuel humidification purposes or to a fuel reaction compartment for use in the fuel reaction.

A fuel cell membrane electrode assembly (MEA) contains a polymer electrolyte membrane (PEM) that is made from an ion conducting polymer. The PEM is modified to contain small passages between opposite surfaces of the PEM. These passages enable liquid water to flow, under sufficient pressure, from the cathode side of the PEM to the anode side of the PEM. This PEM is sometimes referred to as a water permeable PEM The PEM has opposing anode and cathode surfaces. In order to create the pressure needed to cause water transport through the PEM passages, a liquid water barrier (LWB) layer is present on the cathode side of the PEM. This layer is electrically conductive and has high gas diffusivity to allow oxygen to reach the cathode catalyst layer but a significant resistance to liquid water flow. During operation, the fuel cell produces water on the cathode side of the PEM. In this embodiment, the LWB layer alone can be sufficient to decrease the flow of liquid water from the cathode to the cathode oxidant stream thereby creating sufficient hydraulic back pressure to cause liquid water flow through the PEM passages from the cathode to anode side of the PEM.

In another embodiment, a gas diffusion barrier (GDB) layer is used in conjunction with the LWB layer. The GDB layer is in many embodiments electrically conductive. However, it need not be electrically conductive in some embodiments employing in-plane current collection. The GDB layer is capable of restricting the flow of water vapor to the cathode oxidant stream. However, it has sufficient gas diffusivity to allow oxygen to pass through it to the cathode catalyst layer.

In some cases a liquid water distribution (LWD) layer is present between the cathode surface of the PEM and the LWB layer. This layer is electrically conductive and allows liquid water to move laterally in a plane parallel to the cathode surface of the PEM. This layer can be used to facilitate the movement of water to the PEM passages and/or to provide for lateral collection of residual water. If catalyst is added to the LWD layer, it may also function as a catalyst layer for the cathode oxygen reduction reaction or for other cathode interface chemical reactions.

A standard gas diffusion layer (GDL) can be used in combination with any or all of these layers and it generally placed distally from the PEM cathode surface to interact with the cathode oxidant stream.

The invention also includes cathodes that can be used to control cathode water flow in combination with standard PEMs or the water permeable PEMs disclosed herein.

In one embodiment, the cathode is made from a GDB layer and a LWB layer. In another embodiment, a single layer cathode can be made that has the properties of the GDB and LWB layers. This single layer cathode can also be used with a LWD layer and/or a GDL. Alternatively, the single layer can be formed on the surface of a standard GDL using a GDB/LWB ink.

In another embodiment the cathode is made from a GDL and a GDB layer. This cathode can further contain an LWB layer positioned so that the GDB layer is positioned between the GDL and the LWB layer. This cathode can also include a LWD layer that is positioned so that the LWB layer is located between the LWD layer and the GDB layer.

In another cathode embodiment, the cathode contains a LWB layer and a LWD layer alone or in combination with a GDL.

In another embodiment, instead of using a CCM where the anode and cathode catalysts are applied to the membrane, these catalysts are applied to the gas diffusion layer assemblies and then bonded under pressure and temperature to cause a mechanical bond with the PEM. In the cathode case, the cathode electrocatalyst is applied to the layer immediately adjacent to the PEM, which may be the LWB layer or the LWD layer.

Membrane electrode assemblies (MEAs) are made from either a catalyst coated membrane (CCM) comprising a polymer electrolyte membrane (PEM) and a catalyst layer, and any of the foregoing cathodes, or from a catalyst coated cathode assembly bonded to a PEM. The PEM can be a standard PEM or a water permeable PEM as disclosed herein.

Fuel cells contain the aforementioned MEAs.

Fuel cell systems are also disclosed that utilize water permeable PEMs. The water permeable PEMs allow the use of highly concentrated fuels such as neat methanol without the need to provide water as a diluant. In such systems a concentrated fuel supply is in fluid communication with an anode loop which in turn is in fluid communication with the water permeable PEM. A LWB layer is located on the cathode side of the water permeable PEM so as to create the hydraulic pressure needed to cause transport of sufficient residual water to maintain the anode reaction and/or the hydration of the PEM. In addition to the LWB layer, any one or more of the above layers can also be used to facilitate the passive recovery of residual water.

Fuel cell systems are also disclosed that utilize standard PEMs. In these embodiments, appropriate cathodes are chosen from those identified above to facilitate passive water recovery.

BRIEF DESCRIPTION OF THE DRAWINGS

FIG. 6 depicts the performance of the fuel cell disclosed in example 2.

FIG. 7 depicts the performance of the fuel cell of Example 2 over 500 hours.

DETAILED DESCRIPTION OF THE INVENTION

Figure 1:
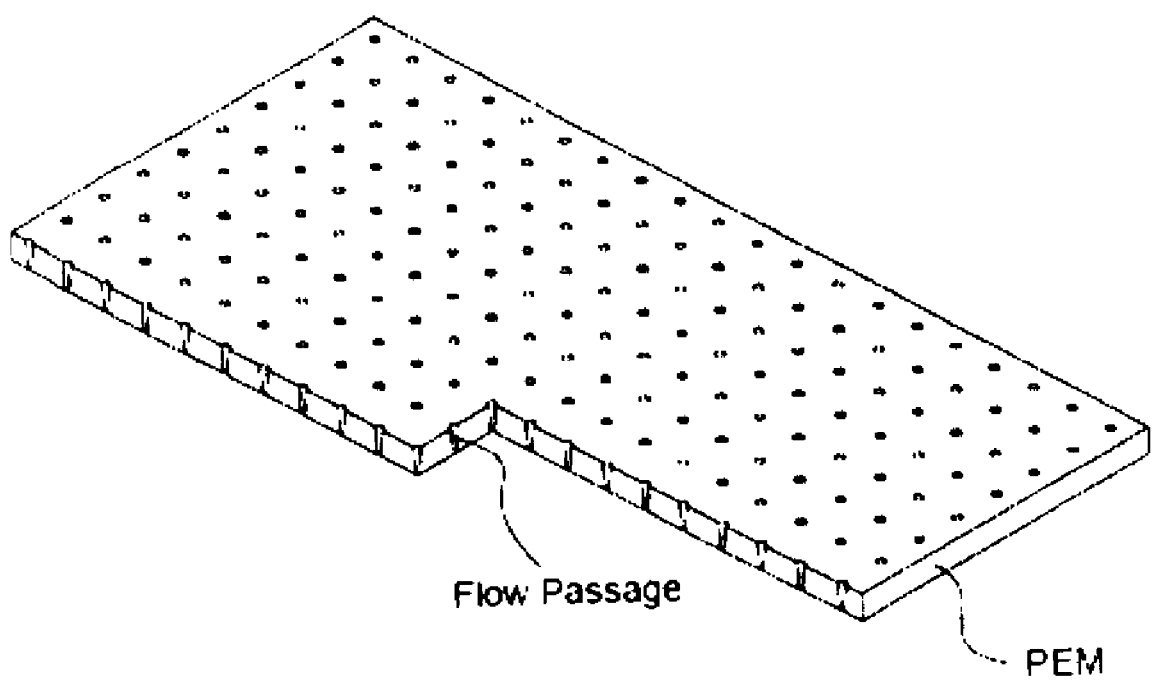
FIG. 1A depicts a water-permeable PEM with a multiplicity of flow passages traversing the PEM from the cathode to anode surface.
FIG. 1B depicts an MEA cross section showing a laser drilled hole. Exit diameter of hole is 2 microns. Cross section was prepared using epoxy back-fill under vacuum with subsequent polishing; a portion of the hole shows it partially filled with epoxy.

Water permeable PEMs and cathodes that control cathode water transport are disclosed. The PEMs and cathodes can be used together to create an MEA that is capable of passive water recovery. Alternatively they may de used separately in which case the water permeable PEMS are used with standard cathodes and the standard PEMs are used with the cathodes disclosed herein.

The cathode electrode comprises one or more layers which have properties which restrict the migration of liquid water and water vapor from the cathode to the oxidant and/or coolant air stream. These layers within the cathode electrode promote the creation of liquid water pressure as liquid water is generated on the cathode side of the PEM.

The water permeable PEMs comprise a layer of ion conducting polymer that has been modified to have integral passageways through the PEM that allow water transport from the cathode to anode side of the PEM.

Fuel Cells

The primary purpose of the invention is to provide passive water recovery of a portion of the liquid water formed at, or transported to, the cathode of a fuel cell. In some cases, a portion of the recovered water is transferred to the anode loop to facilitate the anode electrochemical reaction in a DMFC (1 molecule of water reacting with 1 molecule of methanol to produce carbon dioxide, protons and electrons). The amount of water which needs to be recovered is preferably equal to or greater than the sum of the following: (1) the amount of water which is consumed in the anode oxidation reaction which in the case of a direct methanol fuel cell is one third of the water produced on the cathode from the electrochemical reaction of protons, electrons and oxygen; (2) the amount of water which is transported from the anode side of the polymer electrolyte membrane through diffusion or electro-osmotic drag or by other means; (3) the amount of water which may depart the anode liquid fuel stream via a gas-liquid separator, such as in the case of a direct methanol fuel cell, the separator of the carbon dioxide from the liquid fuel; (4) the amount of water which may be exhausted from the anode fuel stream in operation through other means (such as the periodic purging of the fuel stream in a hydrogen-air fuel cell).

Other fuel cells which employ polymer electrolyte membranes (PEM) and use hydrogen, organic fuels or blends of fuels would also benefit from the passive water recovery from the cathode to the anode as a known feature of this type of ion conduction mechanism (the polymer electrolyte membrane) is the 'electro-osmotic drag' by which the proton ions, which move from anode to cathode, typically 'drag' or have associated with them water molecules which migrate from the anode to the cathode. While the exact mechanism for this 'electro-osmotic drag' is still a topic of debate, it has been observed that there is a net water transport of water from the anode to the cathode associated with the flux of protons which causes a depletion of water at the anode that may also lead to the depletion of water in portions of the PEM. It is well known that water molecules are required in PEMs having ion conducting sulfonate groups, in order for the PEM to retain sufficient ion conductivity to support the desired electrochemical reaction. If the local concentration of water near the functional sulfonate groups in the PEM decreases significantly, the local ion conducting properties of the PEM will also decrease, leading to a local decrease of performance (current density or electrochemical reaction rate at the given voltage of the cell) which is detrimental to the performance of the fuel cell itself and may lead to damage or unsafe operating conditions (if this occurs unevenly between cells in a fuel cell stack assembly). Furthermore, it has been desired by the industry (e.g., as exemplified by the US DOE technical targets for PEM fuel cells) to reduce the amount of additional water supplied to the fuel cell itself. This desire is represented by the reduction of the humidification or partial pressure of water vapor which enters the fuel cell during operation. Passive recovery of cathode residual water facilitates the replenishment of anode side water from the cathode, potentially leading to performance and durability improvements and possibly enabling the operation at lower inlet reactant gas humidity levels. It further facilitates the maintenance of water within the PEM and distribution of water over the planar area of the PEM.

Furthermore, there are additional types of fuel cells in which water is a reactant species but not within the fuel cell itself, rather the water is used in a reaction process external to the fuel cell. Examples of these types of fuel cells are the reformed methanol fuel cell, in which methanol is reacted with water in a reformer (a higher temperature catalyst bed process) to create primarily carbon dioxide and hydrogen, and chemical hydride fuel cells (an example of which is sodium borohydride), where water is used as one of the reactants with the chemical hydride to produce hydrogen. Using this invention, residual water can be collected from the PEM fuel cell and directed through passages or flow mechanisms to the reaction process external to the fuel cell. A water collection manifold within the fuel cell can be used as one means of directing recovered residual water within the fuel cell to an external fluid path, such as a tube or pipe, from the fuel cell to the reaction site.

Passive Water Recovery

Passive water recovery means water recovery from the cathode side of a fuel cell that does not involve additional components external to the fuel cell itself to effect collection of water from the cathode exhaust stream (i.e., condensers, water traps, water pumps or other mechanisms for directing such water from the cathode oxidant exhaust back to the anode fuel stream). Fluid connection via pipes, tubes, manifolds, channels, or other mechanisms which have sufficiently low liquid water flow resistance can be used to direct the recovered water to the desired location without substantial loss of water to other locations. Non-passive recovery of water typically requires some form of power to direct the collected water to a desired location where the water is either used in an electrochemical reaction or rejected to the environment or collected for future use. It further typically represents an additional heat load on the system, to condense water from the vapor state and direct such water to a desired location.

Passive water recovery is advantageous for fuel cell power generators because it simplifies the design of the system, reduces the size, weight, and cost of the system, and leads to higher volumetric and gravimetric power and energy density for the fuel cell system, all of which are highly desirable features.

This invention describes a number of ways whereby the recovery of liquid water from the cathode and re-introduction into the anode can be accomplished internally to the cell without additional system components. It further describes a number of ways whereby such recovered water can be directed to components outside the fuel cell itself whereby such water is useful.

All of the variants of this liquid water recovery strategy can be used in either a planar array or a stack configuration with through-plane current collection. They can also be used either with a combined oxidant-coolant strategy, or with a more conventional low flow, low oxidant stoichiometry oxidant source and a separate heat rejection location, for example a liquid heat exchanger in the fuel loop or a separate liquid cooling loop.

All variants of the invention exploit the key physical principle of capillary pressure in a hydrophobic pore, whereby liquid water will preferentially penetrate a larger diameter pore, leaving a smaller diameter pore network full of gas only.

The Water Permeable PEM

In one embodiment the water permeable PEM has integral water passages that traverse the PEM from the anode to cathode surfaces of the PEM as shown in FIG. 1. The water permeable PEM has a combination of features where (1) over one aspect of its surface it has ion conductivity, low fuel diffusivity, low water permeation and is absent any flow passages for liquid water, and (2) over another aspect of its surface it has high water permeation properties, through features such as integral flow passages (or channels) between opposing surfaces which enable the transport of liquid water across the membrane. The liquid water transport passages may constitute small holes in the PEM which may be formed after the fabrication of the PEM by mechanical, electro-static, thermal (such as laser), or other means. The liquid water transport passages may also be formed during the fabrication of the PEM by the inclusion of pore formers which create flow passages from one surface of the PEM to the other surface. The small flow passages may be created by using a polymer blend in the creation of the PEM, with one polymer constituent having low permeation resistance to liquid water and the other polymer having high permeation resistance to liquid water. At least one of aforementioned polymers must have ion conducting capabilities, preferably the one with high permeation resistance. The polymer blend may also contain additional polymers which may induce functionality other than for ion or liquid water transport. Another embodiment uses a support matrix of polymer, such as EPTFE or other suitable material, to dimensionally stabilize the PEM, and the water permeable features can be either created during the formation of the film in the support matrix through one or more of the aforementioned means or by creation of flow passages after the PEM has been formed in the support matrix. A further embodiment uses a multi-layer PEM where at least one layer of the multi-layer PEM has a combination of high and low liquid water permeation features The planar surface area of the higher water permeable region of the PEM is preferably between 0.000001-50%, more preferably 0.000001-1% and most preferably 0.000001-0.001%. However, the choice of hydraulic pore size, the percent of PEM surface containing pores and their spacing will depend on the operating parameters of the fuel cell and can be empirically determined for each application. (See below re: 150 mA/cm$^2$ design.) It is preferable to have a higher percentage of the planar surface area of the PEM have low permeation and diffusivity properties and a smaller percentage of the area have higher liquid water permeation properties, i.e. the ratio of the cross-section of high liquid permeability to the cross-section of low liquid permeability is less than 1. The PEM is typically less than 200 microns in thickness and preferably less than 100 microns, and more preferably less than 25 microns. The effective hydraulic diameter of such passages through said PEM is typically 1 to 25 microns, preferably 2 to 10 microns, and more preferably 2 to 5 microns.

Figure 2:
FIG. 2 depicts a water-permeable PEM having areas that are water permeable and areas that are not water permeable.

An example of a PEM with a pattern of individual passages is shown in FIG. 1A. FIG. 1B shows a cross section of one of the passages made by a laser. The diameter of the passage at its narrowest is 2 microns. The diameter of the hole at the point of laser entrance is about 7 microns. Part of the hole near the entrance is filled with epoxy used in making the cross section sample for microscopy analysis. The hydraulic diameter is the smallest diameter in a given passage. In this case it is about 2 microns. FIG. 2 is a plane view of a PEM with areas that are water permeable and areas that are not is shown in FIG. 2.

The Cathode

Figure 3:
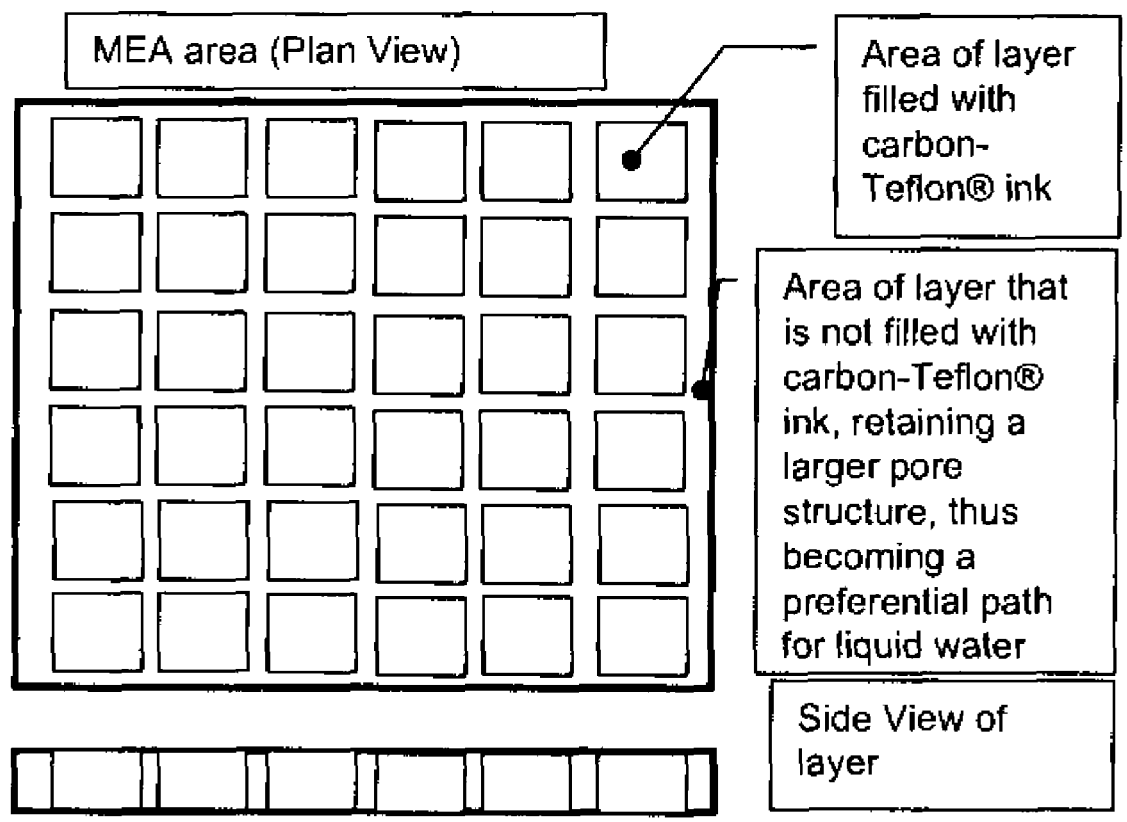
FIG. 3 schematically depicts the various layers that can be used alone or in combination to form a cathode useful in the passive recovery of water.
Figure 4:
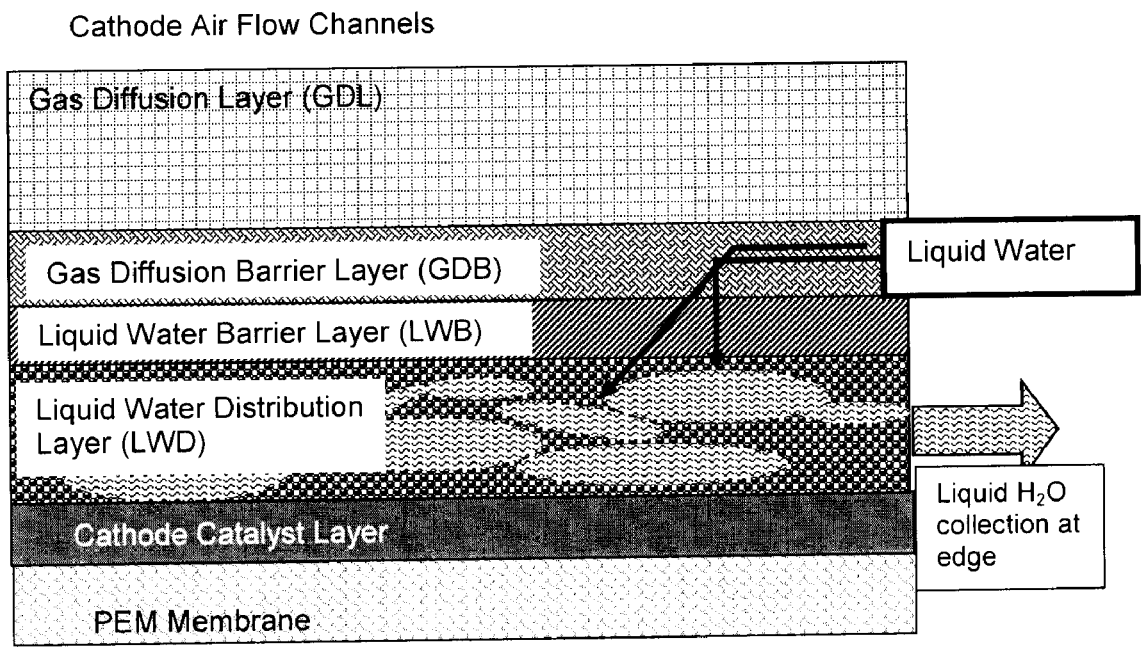
FIG. 4 depicts a cross-section of the cathode side of a membrane electrode assembly. The liquid water barrier layer and gas diffusion barrier layer restrict the flow of liquid water and water vapor from the cathode catalyst layer to the cathode air flow channel. The liquid water distribution layer is water permeable and provides for the lateral flow of liquid water away from the cathode catalyst layer for lateral edge collection or to regions of the PEM which are water permeable.
Figure 5:
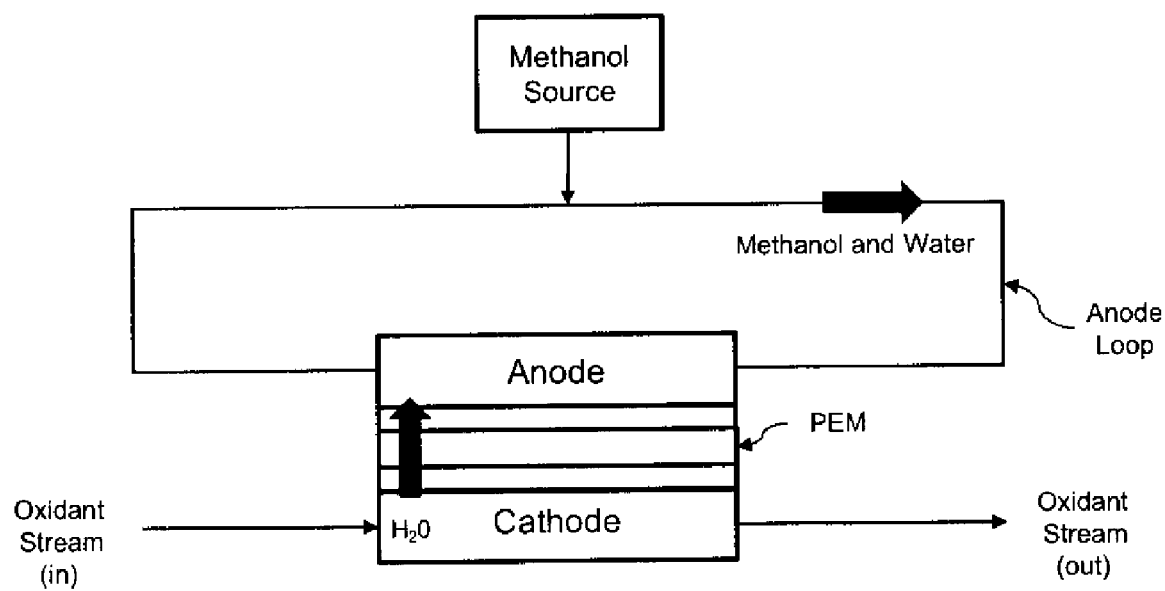
FIG. 5 depicts a fuel cell system including a methanol source, an anode loop, and a fuel cell containing an MEA dividing the fuel cell into anode and cathode chambers. When a water-permeable PEM is used in conjunction with liquid water barrier layer, liquid water flows directly from the cathode to the anode, as depicted by the arrow. Alternatively, a standard PEM can be used providing for lateral collection of water which can be used for other purposes such as transfer of cathode water to the anode loop.

The components of the cathode are shown in FIG. 3 and FIG. 4. These components can be combined in a number of different ways to form the cathodes of the invention.

The cathode comprises a combination of layers which have properties which restrict the migration of liquid water and water vapor from the cathode to the oxidant and/or coolant air stream. These layers within the cathode electrode promote the creation of liquid water pressure as the liquid water is produced on the cathode side of the PEM (a) The Liquid Water Barrier Layer A key element in the cathode is a "liquid water barrier layer" (LWB layer), which is a layer within the cathode that is electrically conductive, permeable to gases to some degree (oxygen and water vapor amongst others), but substantially impermeable to liquid water. This liquid barrier layer can be characterized as one in which pressure is required to induce movement of liquid water through this layer. The aforementioned pressure is sufficiently greater than the sum of the maximum fuel pressure, plus the pressure loss of liquid water permeating the PEM, plus the in-plane liquid flow losses in the water distribution layer, to enable reasonably uniform liquid water distribution across the surface of said PEM. Such liquid water pressure is typically greater than or equal to 30 kPa (4.35 psi) but could be adjusted by persons skilled in the art, depending on design of fuel cell components.

The liquid water barrier layer may be formed from a porous, electrically conductive media such a carbon fiber paper typically used as gas diffusion layers in the PEM fuel cell industry which is then impregnated with carbon and/or graphite powder, Teflon® (PTFE and/or FEP) and other liquid ink slurry constituents. This carbon/Teflon® slurry is then heated to enable the liquids to evaporate and the Teflon® to both act as a binder to hold the carbon particles in position and to create a liquid water permeation resistance due to the hydrophobic nature of Teflon®. There are several materials available commercially which have Teflon® binders used to hold carbon and/or graphite powders within gas diffusion layers, but most do not exhibit significant flow resistance to liquid water. This liquid water flow resistance can be measured using a simple jig which measures the pressure of water versus flow rate through an area of material. Such tests typically show that for liquid water barrier layers there is a pressure required before any measurable water is observed flowing through the material, after which there is typically a linear relationship of liquid water flow rate over liquid water pressure, which would be expected for porous media flow. Both the initiation pressure to induce water flow and the slope of liquid water flow versus water pressure can be used to select appropriate materials. In the invention, a pressure of greater than 30 kPa water pressure is used to select and optimize candidate layers (materials and manufacturing processes) for the liquid water barrier layer. The method of characterizing water flow through the cathode LWB layer is similar in principle as that used to characterize the water pressure used to permeate breathable, water resistant clothing (e.g., EN343).

The resistance to liquid water flow in the liquid water barrier layer is principally caused by a network of small hydrophobic pores. The pores restrict the flow of water which creates a hydraulic pressure for liquid water either at the interface of the liquid water barrier layer and the cathode catalyst layer or within the liquid water distribution layer (see below) which, if present, is between the cathode catalyst layer and the liquid water barrier layer. This pressure directs the liquid water directly to the passages in the PEM or indirectly via the liquid water distribution layer and thus to the areas where such water can migrate through the plane of the catalyst layer and through the flow passages that are normal to the surface of the PEM to the anode compartment. The liquid water pressure induced by the liquid barrier layer induces the liquid water to flow. But this pressure is normally insufficient to enable substantial amounts of liquid water to permeate the liquid water barrier and also insufficient to cause substantial amounts of liquid water to permeate the PEM itself over those areas of its surface which have low liquid water permeability. However, it is sufficient to enable the liquid cathode water to flow (1) in a plane parallel to the plane of the MEA within the liquid distribution layer and (2) through the catalyst layer and (3) through the PEM from the cathode side to the anode side via zones of high liquid permeability in the PEM such as through flow passages. It is also possible in the case of (3) for the liquid water to be directed to flow passages which are separate from the PEM and direct the water to the anode stream directly, such as to a fluid manifold which is in fluid connection with said fuel stream or to the fuel processing unit which may be external to the fuel cell. The liquid water barrier layer is not a complete barrier; rather it has sufficient gas porosity to enable the diffusion of gaseous state species such as oxygen, nitrogen, water vapor, carbon dioxide, and methanol amongst others, to diffuse through it at rates which enable the electrochemical reaction at the cathode to be sustained. However, it does have substantial resistance to the flow of liquid water through-plane which can be measured by the pressure which induces liquid water to permeate this layer.

The liquid water pressure created by the build-up of liquid water at the liquid barrier layer is often insufficient to motivate liquid water to permeate through conventional PEM membranes having thicknesses between 50 and 175 microns (as measured in the dry state). However, the pressure may be sufficient to cause water transport across thinner membranes. In addition, the liquid barrier layer can be used with perfluorinated membranes such as Nafion, manufactured by E.I. du Pont de Nemours and Company, either alone or in combination with the formation of passages across the Nafion membranes.

(b) The Gas Diffusion Layer

A gas diffusion layer (GDL) is a layer which typically is made from carbon fibers, which has a high level of porosity, typically more than 50% in the non-compressed state. In certain embodiments it is also made from electrically conductive material. The functional requirement of the GDL is that it must enable movement of the reacting species and reactant product species to/from the current collector plate or flow field plate, and from/to the electro-catalytic layer where the reaction(s) take place, possibly through intermediary layers. In some embodiments, the GDL is also the current collector in which case electrons may travel 'in-plane' within the GDL. In the case of carbon fiber type GDLs, the fibers can be oriented, as in the case of woven materials such as carbon cloth, or randomly oriented such as in the case of carbon fiber paper type products which are fabricated from a slurry of carbon fibers of various lengths, and evaporating off and potentially carbonizing or even graphitizing resins in the slurry to create bonds between the carbon fibers to affix them relative to one-another. There are further methods to create carbon fiber based GDL, which are not described here but are known in the art. Furthermore, there are alternative materials which have high porosity and appropriate diffusion properties which can also be used as GDLs, such as metal screens and perforated graphite materials.

(c) The Gas Diffusion Barrier Layer

The gas diffusion barrier layer (GDB) layer is preferably interposed between the liquid barrier layer and the cathode gas diffusion layer although it may be interposed between the gas diffusion layer and the oxidant air flow passages. The gas barrier layer has low gas permeability and may also be hydrophobic. The purpose of this layer is to restrict to a certain degree the diffusion rate of water vapor through it from the cathode catalyst layer to the oxidant air stream but also to enable sufficient diffusion of the reactant species oxygen from the oxidant air stream through this layer, through the liquid water barrier layer, through the liquid water distribution layer (if present) to the cathode catalyst layer to support and maintain the electrochemical reaction. As the mechanism of transport of both water vapor and oxygen is gas diffusion, the diffusion properties of the gas diffusion barrier layer are optimized based on an operating fuel cell temperature of approximately 45 to 60 Celsius. The regulation of temperature of the fuel cell in part governs the rate of diffusion of gases through the gas diffusion barrier layer. As the fuel cell electrochemical reaction is exothermic, it is conventional for the fuel cell to employ cooling mechanisms such as heat exchange to the ambient air, to regulate the temperature of the fuel cell itself. The concept of a gas diffusion barrier is disclosed in U.S. Pat. No. 6,451,470, "Gas Diffusion Electrode with Reduced Diffusing Capacity for Water and Polymer Electrolyte Membrane Fuel Cells", Koschany et al., Assignee: Magnet-Motor Gesellschaft für Magnetmotorlsche Technik mbH (DE).

The gas diffusion barrier layer may be created by forming a micro-porous layer of electrically conductive particles such as carbon or graphite, and using binders such as one or more of the following: PVDF, PTFE, FEP. An alternative method to create the gas diffusion barrier layer is to form a thin, electrically conductive film which has pore forming agents contained therein during forming and which can be removed after forming, leaving the desired diffusivity. Other methods may be used by those skilled in the art to create the target diffusivity range.

The GDB in some embodiments is applied to the GDL, which restricts the diffusion rate of gases through it. By comparison to the GDL, it has very low diffusivity. This GDB can be formed by applying a mixture of carbon, graphite, and PTFE such that a low pore volume fraction sublayer is formed.

The GDB layer resists the flow of water vapor but allows the sufficient diffusion of oxygen gas across the layer. The GDB layer has diffusion properties which are related to the desired operating current density and operating temperature of the cell as set forth in Table I:

TABLE I

| Current Density ($mA/cm^2$) | Cathode $H_2O$ Vapor Mass Transport Coefficient (m/sec) | | |
|---|---|---|---|
| | Cell Temperature 45-55 Celsius | Cell Temperature 35-45 Celsius | Cell Temperature 25-35 Celsius |
| 25 | 0.00028-0.00015 | 0.00052-0.00028 | 0.0010-0.00056 |
| 50 | .00056-0.00030 | 0.0010-0.00056 | 0.0021-0.0011 |
| 100 | .0011-0.00061 | 0.0021-0.0011 | 0.0041-0.0022 |
| 150 | 0.0017-0.00091 | 0.0031-0.0017 | 0.0062-0.0034 |
| 200 | 0.0023-0.0012 | 0.0041-0.0022 | 0.0083-0.0045 |
| 400 | 0.0045-0.0024 | 0.0083-0.0045 | 0.017-0.0089 |

In addition to the foregoing, the overall mass transport properties of the gas barrier layer can be optimized to be in a range of 0.001 to 0.0015 m/sec, based on an operating fuel cell temperature of approximately 50 Celsius.

Accordingly, the desired system operation point (temperature, current density) is used to define the desired cathode gas diffusion barrier (GDB) layer water vapor mass transport coefficient range.

The foregoing describes the use of separate LWB and GDB layers in making a cathode. However, the properties of the separate layers can be combined in a single layer. For example, a LWB/GDB ink can be layered on a plastic coupon to produce a single layer with properties of the LWD and GDB layers. Alternatively, the LWD/GDB ink can be layered directly on a GDL. Example 1 sets forth the preferred method of forming such a layer by repeated application of the LWB/GDB ink on a gas diffusion layer.

(c) The Liquid Water Distribution (LWD) Layer

The liquid water distribution layer, if present, is interposed between the cathode catalyst layer and the cathode liquid water barrier layer. Alternatively, it may be an inherent part of the cathode catalyst layer itself. A liquid water distribution layer is typically permeable to liquid water, water vapor and gases such as oxygen but has lower porosity and higher hydrophobicity than the aforementioned GDB layer. The purpose of this layer is to enable liquid water movement laterally in the plane of the PEM, with a low in-plane flow resistance, through a combination of larger diameter pores which are mostly fluidly interconnected. Such pores are interspersed within a matrix of small, highly hydrophobic pores, or flow passages within this layer, whereby liquid water moves to regions of the catalyst layer which are in the immediate region of the high water permeation regions of the PEM. Cathode water moves from the liquid distribution layer through the catalyst layer and the PEM to the anode chamber where such liquid water may participate in the fuel oxidation reaction (in the case of methanol) and possibly dilute the fuel itself. The liquid water distribution layer is electrically conductive and has high gas diffusivity enabling reactant gas species to migrate through the layer to the catalyst layer to participate in the electrochemical reaction. This layer is generally hydrophobic which serves to enable gas diffusion through it through an interconnected network of small pores but also to direct liquid water to either or both of a network of interconnected larger hydrophobic pores or passages, which have lower capillary surface tension effects on liquid water or integral lateral flow passages contained within this layer. The flow passages are also substantially interconnected and act as collection vessels (ditches) for liquid water. The effective in plane liquid permeability should be in the range of $1\times10^{-8}$ to $2\times10^{-10}$ cc/sec Pa. FIG. 4 shows an example of LWD liquid water flow passages which may be created during the formation of the LWD layer. A further example of the concept of a liquid water distribution layer through flow passages is described in U.S. Pat. No. 6,890,680 "Modified Diffusion Layer for Use in a Fuel Cell System, Beckmann et al, and U.S. Pat. No. 7,179,501 "Modified Diffusion Layer for use in a Fuel Cell System", Beckmann et al., both assigned to MTI MicroFuel Cells.

The distinguishing feature of a LWD layer and the LWB layer is the amount of pressure required to induce water movement through the layer itself. If the layer requires a significant amount of water pressure to induce liquid water movement and there is no available path for the liquid water to migrate at such pressure, the pressure will build to the point where it induces water flow through the layer. Such pressure is typically very low for the LWD layer and cannot be practically used to direct water either through the PEM, through engineered paths, through the PEM itself, or through other flow passages. Furthermore, such LWD layers typically have high diffusion or gas permeation properties, which do not act to sufficiently reduce the transport rate of water vapor through this layer. Conversely, the LWB layer requires higher liquid water pressure to induce liquid water movement through it. Before the liquid water reaches sufficient pressure to motivate it to migrate through the LWB layer, such water is directed through a lower flow resistance path through the LWD layer and through the PEM to the anode. The pressures needed for water permeation through a normal, PEM such as a Nafion membrane and through a water permeable PEM as disclosed herein are significantly different. Ren et al. (WO 2004/093231) discloses a pressure of 3.2 atm (~50 psi) for Nafion 112 (2 mil or 50 micron thick membrane) when the cell operates at 100 mA/cm2. Furthermore, Ren et al. also discloses 11.3 atm for Nafion 117 (7 mil or 175 micron thick membrane). We previously observed that for a PEM similar to that in the examples, a pressure of 100 psi was required for an operating current of 150 mA/cm2, based on some ex-situ testing (i.e., not with an operating cell). These pressures may be unrealistic for conventional fuel cell designs.

Conversely, the hydrostatic pressure needed to obtain sufficient water flow from cathode to anode is highly dependent upon the size of the holes, the distribution of the holes (how far apart are they), the flow resistance of the liquid distribution layer, and the current density (lower current requires less water flow, hence lower resistance and lower pressure required).

Table II shows the pressure drop for a set of holes of various diameters and for various hole spacing using a 20-micron-thick membrane at 150 mA/cm$^2$. One can easily see that larger holes, more closely spaced, require less hydrostatic pressure across them to achieve the desired water flow rate through them, corresponding to the water required flow from the cathode to the anode (⅓ of the electrochemically produced water plus all Electro-Osmotic Drag (EOD) water, ignoring water generated from methanol diffusion from anode to cathode).

TABLE II

Through-plane pressure drop (kPa) required to drive
⅓ of product H$_2$O, plus EOD from anode to cathode
For 150 mA/cm$^2$, 20 micron membrane

| Hole Diameter | Hole spacing (mm) | | |
|---|---|---|---|
| (microns) | 1 | 2 | 5 |
| 1 | 131 | 538 | 3435 |
| 2 | 8 | 33 | 214 |
| 5 | 0.21 | 0.83 | 5.518 |
| 10 | 0.014 | 0.055 | 0.345 |
| 15 | 0.0028 | 0.0138 | 0.069 |
| 20 | 0.00083 | 0.0034 | 0.021 |

Table III shows the maximum in-plane flow resistance pressure loss for different hole spacing, depending on the in-plane permeability. The farther apart the holes are, the higher the pressure loss.

TABLE III

Maximum In-Plane pressure loss (kPa)
at 150 mA/cm$^2$

| In-plane liquid permeability of liquid distribution layer | Hole spacing (mm) | | |
|---|---|---|---|
| (cc/secPa) | 1 | 2 | 5 |
| $1 \times 10^{-12}$ | 166 | 821 | 6208 |
| $1 \times 10^{-11}$ | 17 | 83 | 614 |
| $1 \times 10^{-10}$ | 1.72 | 8.28 | 62.078 |
| $1 \times 10^{-9}$ | 0.172 | 0.828 | 6.208 |

For example, the DM-2 membrane based MEA in Example 2, has 2 micron holes and 2 mm hole spacing. At 150 mA/cm$^2$, 33 kPa (4.8 psi) is needed to motivate sufficient water through the holes. Further, the in-plane permeability for the cracked liquid water distribution layer is $1\times10^{-10}$/(sec-Pa) and $1\times10^{-12}$ cc/(sec-Pa) for layers without any cracking (less preferred). Using an intermediate value of $1\times10^{-11}$ cc/(sec-Pa), the pressure loss through the LDL for 2 mm hole spading is 83 kPa (12 psi). Combined the required hydrostatic pressure to motivate sufficient water is 116 kPa (16.8 psi).

A DM-2 membrane with 5 micron holes on 2 mm spacing requires 0.83 kPa (0.12 psi). If a cracked LWD layer has an in-plane permeability of $1\times10^{-11}$ cc/(sec-Pa) is used, an additional 8.3 kPa (1.2 psi) is required. At the operating point of 150 mA/cm2, combined these would require a hydrostatic pressure of 9.1 kPa (1.32 psi) to achieve sufficient water flow from cathode to anode.

The best mode utilizes 5 micron holes with optimization of the LWD layer and hole spacing to require approximately a hydrostatic pressure of not more than 10 psi to motivate water transport across the PEM.

MEA Embodiments

In one embodiment, the MEA has a cathode electrode structure that comprises a combination of (1) a GDL, (2) a gas barrier diffusion layer which balances the restriction of water vapor diffusion exiting the cathode with oxygen diffusion through to the cathode catalyst layer to maintain the desired reaction, (3) a liquid water barrier layer, (4) optionally a lateral liquid water transport layer, (5) a cathode catalyst layer, and (6) a PEM. The PEM is water permeable and has at least two regions, one of which has high water permeability and the other of which has low water permeability, as shown in FIG. 3.

In another embodiment, the aforementioned MEA may have a conventional PEM with reasonably uniform liquid water permeability and with fluid passages that traverse the PEM so that water produced at the cathode is in fluid communication with the anode fuel loop via such passages such as shown in FIG. 6.

In a further embodiment, the fluid passages are in fluid communication with an external fuel reaction chamber such as a fuel reformer.

In another embodiment, the MEA comprises a combination of (1) a PEM with areas of high and low liquid water permeability, having opposing anode and cathode surfaces, (2) an electrically conductive cathode liquid water barrier layer, (3) a cathode gas diffusion barrier layer and (4) a cathode gas diffusion layer. In this embodiment, the cathode liquid distribution layer as previously described is absent. The PEM has sufficiently well distributed areas of high water diffusivity over its surface that liquid water easily migrates to these areas through one or more of: pores in the catalyst layer, pores near the interface of the liquid barrier layer and the catalyst layer, and/or at the interface of the catalyst layer and the liquid barrier layer. The cathode catalyst layer is interposed between said liquid barrier layer and the cathode surface of the PEM and has sufficient gas and liquid permeability to enable both gas diffusion to support the electrochemical reaction and liquid water permeation both through plane and in-plane of the MEA to the high permeation areas of the PEM and thus through the PEM to prevent accumulation of liquid water on the cathode. Similar to the prior embodiment, the liquid water barrier layer is interposed between the catalyst layer and the gas barrier layer; the gas barrier layer is interposed between the liquid barrier layer and the gas diffusion layer; the gas diffusion layer is interposed between the gas diffusion barrier layer and the gas stream which contains the oxidant reactant species.

In a further embodiment, the MEA comprises a combination of (1) a PEM with relatively uniform liquid water permeability, having opposing anode and cathode surfaces, (2) an optional cathode liquid distribution layer, (3) an electrically conductive cathode liquid water barrier layer, (4) a cathode gas diffusion barrier layer and (5) a cathode gas diffusion layer and fluid passages in the cathode assembly which are in fluid communication with both the zone between the cathode liquid barrier layer and the PEM and the anode fuel loop or with an external fuel reaction chamber.

In yet another embodiment the MEA comprises a water permeable PEM (or a standard PEM) and a cathode comprising a single layer having LWB and GDB properties as discussed above and as set forth in Example 1. The cathode can further include a GDL and/or a LWD layer.

Water Distribution

There are two ways liquid water can be directed in an MEA. These embodiments fall into two categories: a) through-plane water recovery through the PEM, and b) lateral water recovery through the flow of liquid water through passages which do not transgress the PEM. Table III summarizes Table III through PEM water recovery embodiments.

TABLE III

Through-PEM liquid water recovery
Methods by which a portion of the surface area of the PEM is made to be more water permeable than the remaining portion of the PEM which is substantially water impermeable.

| | |
|---|---|
| Intrinsic Membrane Properties | PEM membrane itself with sufficient liquid water permeation properties to enable water migration to the cathode with sufficient water pressure. Thinner versions of Nafion ® may be an example of such a membrane<br>PEM membrane with low water permeation properties used in combination with one or more other polymers which have higher water permeation properties<br>Multi-layer PEM membrane which has at least one layer which has sufficient water permeation properties over a portion of its area sufficient to promote water migration under pressure |
| Manufactured porosity | Use of pore formers during the film manufacturing process which are subsequently removed<br>Quenching of the cast film with residual solvent contained within, bi-axial orientation stretching or other film processing steps which promote the freezing of the polymer membrane morphology such that it has inherent porosity. Such techniques are used in industry to create micro-porous polymer films for the filtration industry |
| Manufactured fluid passages after PEM film manufacture | Examples of methods of creating holes:<br>electric arc<br>laser drilling<br>mechanical perforation<br>Persons skilled in the art would be able to create holes using additional methods |
| Multi-layer PEM | More than one layer in intimate contact in which at least one layer has a portion of its area with sufficient water permeation properties to enable water to migrate from cathode to anode with the water pressure generated by the liquid barrier layer, and which has a portion of its area with lower water permeation properties. Other layers may have high water permeation properties over their entire surface or at least in the regions matching that of the other layers. |

Table IV summarizes lateral water recovery.

TABLE IV

Lateral liquid water recovery (all cathode side features)
Methods by which flow passages are created and enable water to move to the anode fuel stream

| | |
|---|---|
| via the lateral water transport mechanism in the cathode side of the MEA | crack network in the liquid barrier layer or the catalyst layer, or a separate layer interposed between the liquid barrier layer and the catalyst layer<br>interface roughness between the catalyst layer and the liquid barrier layer<br>features (embossed, printed, scribed, etc) in either the catalyst layer or the liquid water barrier layer at or near the interface between each other. |

TABLE IV-continued

Lateral liquid water recovery (all cathode side features)
Methods by which flow passages are created and enable water to move to the anode fuel stream

| | |
|---|---|
| fluid connection to a separate liquid water manifold | an additional fluid manifold is contained within the fuel cell stack and is in fluid connection with the lateral water transport mechanism of the cathode side of the MEA |
| Fluid connection to either the inlet or outlet fuel stream | The lateral water transport mechanism of the cathode side of the MEA is in fluid connection with either or both of the fuel inlet or outlet streams.<br>In the case of a liquid organic fuel cell, such as DMFC, there may be restrictions to limit the potential flow of liquid fuel directly into the cathode side of the MEA, such restrictions which would be overcome by the pressure created by the formation of liquid water pressure when water accumulates on the cathode side of the MEA. |

Through-PEM Liquid Water Recovery

The PEM membrane can be used to transport water directly from the cathode to the anode. Typical PEM membranes have insufficient permeability to enable sufficient liquid water transport. Special PEM membranes are fabricated, ones that are especially thin or ones that have high water permeation properties, can be used to provide a water transport path from cathode to anode. But such membranes present challenges because they would also enable the permeation of fuel from anode to cathode. It is preferred to have a PEM with a combination of low and high water permeability properties and more preferred to have the high permeability properties over a minority of the surface area of the PEM. It is further preferred to use the PEM with low and high water permeation properties in combination with a cathode electrode structure which includes a liquid water barrier layer and a gas barrier layer.

The high permeability properties of the PEM can be created by a variety of means. They can be created by the morphology of the PEM itself when it is fabricated through a combination of the properties of the polymer itself and of the fabrication methods. They may also be created by combining the PEM polymer with another polymer which has higher water permeation properties and fabricated into a film such that the properties of the second polymer exist in a minority of the surface area. Another method may be the use of pore agents in the fabrication of the film, such pore forming agents would be removed after film fabrication by exposing the film to a solvent which causes the pore forming agents to go into solution. In some cases, the pore forming agent may be soluble in water itself. A further method may be to use fabrication methods which induce a controlled porosity of the PEM itself, such as quenching the film in water while it contains high levels of residual solvent, thereby freezing the polymer morphology in a more open state. The film could be bi-axially stretched during fabrication to induce porosity. Further, there are means in which small flow passages or holes may be created in specific locations in the PEM, such methods may include: electro-static discharge, mechanical perforation, laser or other treatments. FIG. 3 shown an example by which small flow passage holes connect the two major surfaces of the PEM.

The PEM may be used in combination with other PEM layers with different properties. A PEM which has a combination of high and low permeation layers can be used with one or more layers which have permeation properties which do not substantially affect the water permeation characteristics of the PEM layer, such as an adhesion promotion layer disclosed in US Patent Publication 2006/0068268. Conversely, a PEM with high water permeation properties can be used in combination with one or more layers which have regions of low and high water permeation, whereby these multi-region layers control the effective permeation of water through the combination of layers.

The through PEM water recovery method can utilize a lateral liquid distribution layer, although in some embodiments this is not necessary, to facilitate the movement of water to the regions of the PEM which have high water permeability. In cases where there are flow passages through the PEM itself (from cathode to anode), it may be desired to have lateral water flow passages to reduce the flow resistance of liquid water movement to reach such through PEM flow passage regions. This liquid distribution layer may be a separate layer or it may be a feature in either or both of the catalyst layer or the liquid barrier layer, or it may be a feature at the interface between the catalyst layer and the liquid barrier layer.

In another embodiment of through-PEM water recovery, the aforementioned cathode structure can be used with a conventional PEM which has only one zone of high water permeation in conjunction with either or both an anode electrode structure which embodies restricted fuel diffusion, or in an operational strategy in which the fuel concentration is maintained sufficiently low. In both options the design or operational strategy is to restrict the fuel concentration at the anode-PEM interface to a level whereby the fuel permeation rate or fuel diffusion rate is sufficiently low so as to not adversely affect to a significant level the electrochemical performance of the fuel cell.

Lateral Liquid Water Recovery

In the lateral water recovery approach, the liquid residual water at the cathode catalyst layer is restricted from exiting through the GDL into the cathode oxidant air channels, and is instead motivated by pressure caused by the liquid barrier layer to flow to lower pressure zones through an in-plane liquid collection network and further directed through passages to be re-introduced into the anode loop or used for other purposes. This can be in combination with the aforementioned gas barrier diffusion layer, GDL, PEM and catalyst layers.

Lateral collection via the LWD can be achieved using a structure as shown in FIG. 4. Liquid water emerges from the cathode catalyst layer, preferentially penetrates into the large pores of the liquid water distribution layer, and reaches the liquid barrier layer. Liquid water fills up the available network of large pores first, being prevented from exiting into the cathode channels by the liquid water barrier layer. Once liquid water has filled the large pore network in the LWD layer, it will either continue to fill subsequently smaller pores, as the liquid pressure rises, or else it will flow out a collection point at the edge of the LWD layer if one is provided. The capillary pressure of liquid water in small hydrophobic pores of the liquid water barrier layer creates the liquid water pressure.

Oxygen can still diffuse through the LWB and optional LWD layers to reach the cathode catalyst layer, since there remains a substantial interconnected network of small pores within the liquid distribution and liquid water barrier layers which remain unfilled with water due to the larger capillary pressure required.

Collecting liquid water laterally requires that a volume fraction of the liquid distribution layer be filled with water and the remaining volume fraction be available for gas diffusion. If this volume fraction is too large, then oxygen diffusion to the catalyst layer will be restricted, causing cathode mass transport losses. Such volume fraction can be empirically developed depending on choice of materials, level of hydrophobicity of the structure (capillary pressure of the liquid flow path versus the gas transport path), the rate of lateral liquid water transport, and the operating conditions.

In some cases the liquid distribution layer can be omitted if its function can be integrated into either or both of the liquid water barrier layer and the catalyst layer.

In order to collect liquid water over the multi-centimeter scale of a practical cell area without creating liquid pressures high enough to damage the MEA, the liquid water distribution layer must possess a relatively high in-plane liquid permeability. To achieve such a high in-plane liquid permeability, an interconnected network of large pores within this layer is necessary. Such a pore network can be created by several means:

A) Designing the liquid water distribution layer ink formulation and/or drying and processing regime such that the LWD layer cracks into a mud-flat crack pattern. The cracks then create a useful interconnected network of large "pores".

B) Printing or otherwise patterning the LWD layer or catalyst layer in order to create a network of large channels to direct liquid water.

C) Embossing or scribing the LWD layer to create a network of large channels.

D) Using a LWD layer with an inherent large surface roughness, so that an interconnected network of large voids is created at the interface between the LWD layer and the cathode catalyst.

To facilitate collection of liquid water from within the water distribution layer, it may be useful to provide features at the cell edge, so that in-plane permeation of liquid is only necessary in the shortest possible path.

The lateral liquid water collection feature of the cathode electrode assembly can be used to direct liquid water to the through-PEM high water permeation areas. It can also be used to direct liquid to fluid passages which are in fluid communication with the anode fuel stream. Further it can also be used to direct fluid to fluid passages which are in fluid communication with an external (to the fuel cell itself) fuel reactor where such liquid water may participate in a reaction.

Ion Conducting Polymers

Ion-conductive copolymers that can be used to make the PEMs used in the invention include ion-conducting copolymers represented by Formula I:

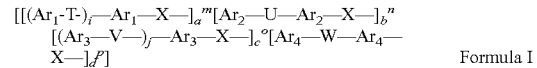
Formula I wherein $Ar_1$, $Ar_2$, $Ar_3$ and $Ar_4$ are aromatic moieties, where at least one of $Ar_1$ comprises an ion conducting group and where at least one of $Ar_2$ comprises an ion-conducting group;

T, U, V and W are linking moieties;

X are independently —O— or —S—;

i and j are independently integers equal to or greater than 1;

a, b, c, and d are mole fractions wherein the sum of a, b, c and d is 1, a is at least 0.3 and at least one of b, c and d are greater than 0; and m, n, o, and p are integers indicating the number of different oligomers or monomers in the copolymer.

An ion conducting copolymer useful in practicing the invention may also be represented by Formula II:

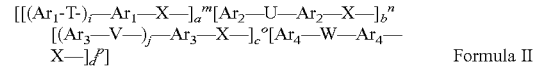
Formula II wherein $Ar_1$, $Ar_2$, $Ar_3$ and $Ar_4$ are independently phenyl, substituted phenyl, napthyl, terphenyl, aryl nitrile and substituted aryl nitrile;

at least one of $Ar_1$ comprises an ion-conducting group;

at least one of $Ar_2$ comprises an ion-conducting group;

T, U, V and W are independently a bond, —O—, —S—, —C(O)—, —S(O)$_2$—,

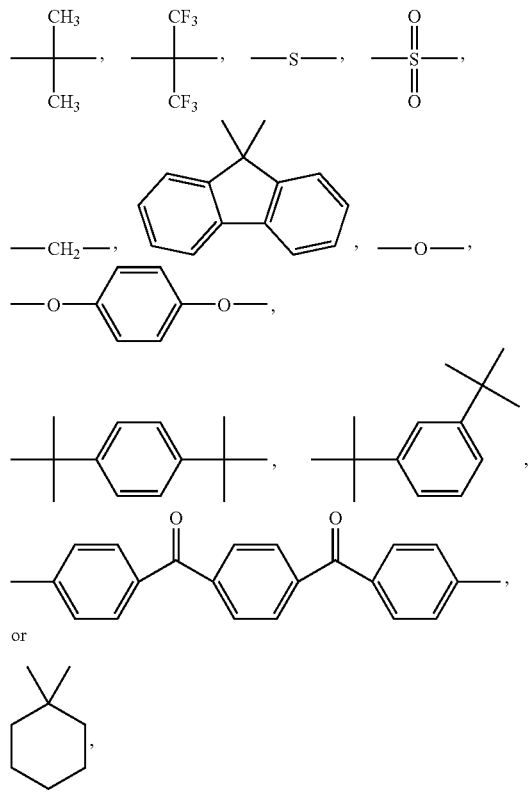

X are independently —O— or —S—;

i and j are independently integers equal to or greater than 1; and a, b, c, and d are mole fractions wherein the sum of a, b, c and d is 1, a is at least 0.3 and at least one of b, c and d are greater than 0; and m, n, o, and p are integers indicating the number of different oligomers or monomers in the copolymer.

$R_1$ and $R_2$ are end capping monomers where at least one of $R_1$ and $R_2$ is present in said copolymer.

An ion-conductive copolymer useful in practicing the invention can also be represented by Formula III:

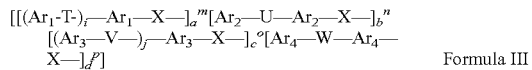
Formula III wherein $Ar_1$, $Ar_2$, $Ar_3$ and $Ar_4$ are independently phenyl, substituted phenyl, napthyl, terphenyl, aryl nitrile and substituted aryl nitrile;

at least one of $Ar_1$ comprises an ion-conducting group;

at least one of $Ar_2$ comprises an ion-conducting group;

where T, U, V and W are independently a bond O, S, C(O), S(O$_2$), alkyl, branched alkyl, fluoroalkyl, branched fluoroalkyl, cycloalkyl, aryl, substituted aryl or heterocycle;

X are independently —O— or —S—;

i and j are independently integers equal to or greater than 1;

a, b, c, and d are mole fractions wherein the sum of a, b, c and d is 1, a is at least 0.3 and at least one of b, c and d are greater than 0; and m, n, o, and p are integers indicating the number of different oligomers or monomers in the ion conducting copolymer.

In an illustrative embodiments, at least two of b, c and d are greater than 0. In some embodiments, c and d are greater than 0. In other embodiments, b and d are greater than 0. In still another embodiment, b and c are greater than 0. In other embodiments each of b, c and d are greater than 0.

The ion conductive copolymers that can be used in the invention include the random copolymers disclosed in U.S. patent application Ser. No. 10/438,186, filed May 13, 2003, entitled "Sulfonated Copolymer," Publication No. US 2004-0039148 A1, published Feb. 26, 2004, and U.S. patent application Ser. No. 10/987,178, filed Nov. 12, 2004, entitled "Ion Conductive Random Copolymer" and the block copolymers disclosed in U.S. patent application Ser. No. 10/438,299, filed May 13, 2003, entitled "Sulfonated Copolymers," published Jul. 1, 2004, Publication No. 2004-0126666. Other ion conductive copolymers include the oligomeric ion conducting polymers disclosed in U.S. patent application Ser. No. 10/987,951, filed Nov. 12, 2004, entitled "Ion Conductive Copolymers Containing One or More Hydrophobic Monomers or Oligomers," U.S. patent application Ser. No. 10/988,187, filed Nov. 11, 2004, entitled "Ion Conductive Copolymers Containing First and Second Hydrophobic Oligomers" and U.S. patent application Ser. No. 11/077,994, filed Mar. 11, 2005, entitled "Ion Conductive Copolymers Containing One or More Ion Conducting Oligomers." All of the foregoing are incorporated herein by reference. Other ion conductive copolymers include U.S. Patent Application No. 60/684,412, filed May 24, 2005, entitled "Ion Conductive Copolymers Containing Ion-Conducting Oligomers," U.S. Patent Application No. 60/685,300, filed May 27, 2005, entitled "End Capping of Ion-Conductive Copolymers," U.S. Patent Application No. 60/686,757, filed Jun. 1, 2005, entitled "Cross-Linked Ion-Conductive Copolymers," U.S. Patent Application No. 60/686,663, filed Jun. 1, 2005, entitled "Polymer Blend Comprising Ion Conductive Polymer and Non-Conductive Polymers," U.S. Patent Application No. 60/686,755, filed Jun. 1, 2005, entitled "Ion-Conductive Copolymers Containing Pendant Ion Conducting Groups," and U.S. Patent Application No. 60/687,408, filed Jun. 2, 2005, entitled "Anisotropic Polymer Electrolyte Membranes."

Other ion-conducting copolymers and the monomers that can be used to make them include those disclosed in U.S. patent application Ser. No. 09/872,770, filed Jun. 1, 2001, Publication No. US 2002-0127454 A1, published Sep. 12, 2002, U.S. patent application Ser. No. 10/351,257, filed Jan. 23, 2003, Publication No. US 2003-0219640 A1, published Nov. 27, 2003, U.S. application Ser. No. 10/449,299, filed Feb. 20, 2003, Publication No. US 2003-0208038 A1, published Nov. 6, 2003, each of which are expressly incorporated herein by reference. Other ion-conducting copolymers that can be end capped are made for comonomers such as those used to make sulfonated trifluorostyrenes (U.S. Pat. No. 5,773,480), acid-base polymers, (U.S. Pat. No. 6,300,381), poly arylene ether sulfones (U.S. Patent Publication No. US2002/0091225A1); graft polystyrene (Macromolecules 35:1348 (2002)); polyimides (U.S. Pat. No. 6,586,561 and J. Membr. Sci. 160:127 (1999)) and Japanese Patent Applications Nos. JP2003147076 and JP2003055457, each of which are expressly identified herein by reference.

Although the ion conductive copolymers that can be used to practice the invention have been described in connection with the use of arylene ether or sulfide polymers, ion conductive polymers that can be used to practice the invention may contain aliphatic or perfluorinated aliphatic backbones (e.g., Nafion), or contain polyphenylene, polyamide or polybenzimidazole backbones. Ion-conducting groups may be attached to the backbone or may be pendant to the backbone, for example, attached to the polymer backbone via a linker. Alternatively, ion-conducting groups can be formed as part of the standard backbone of the polymer. See, e.g., U.S. 2002/018737781, published Dec. 12, 2002 incorporated herein by reference. Any of these ion-conducting oligomers can be used to practice the invention.

An illustrative ion-conductive block copolymer for use in a direct methanol fuel cell has the following formula:

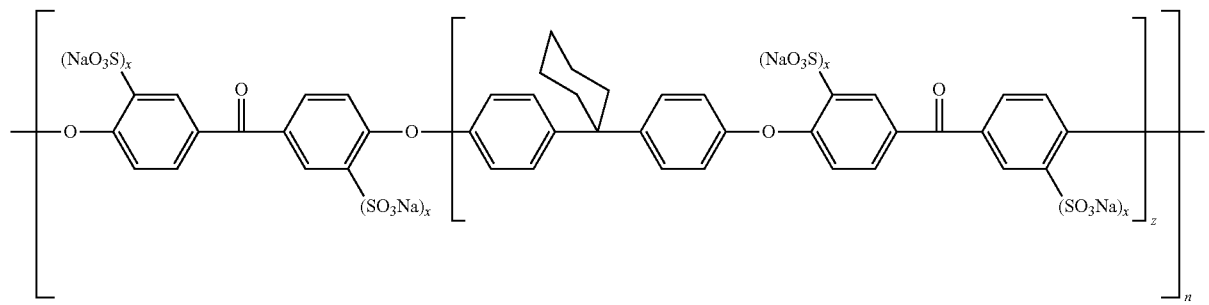

wherein
m is from about 10 to about 500;
each x is independently an integer of 0 or 1;
z is from about 10 to about 500; and
n is from about 40 to about 4000.

The mole percent of ion-conducting groups when only one ion-conducting group is present in comonomer is preferably between 30 and 70%, or more preferably between 40 and 60%, and most preferably between 45 and 55%. When more than one conducting group is contained within the ion-conducting monomer, such percentages are multiplied by the total number of ion-conducting groups per monomer. Thus, in the case of a monomer comprising two sulfonic acid groups, the preferred sulfonation is 60 to 140%, more preferably 80 to 120% and most preferably 90 to 110%. Alternatively, the amount of ion-conducting group can be measured by the ion exchange capacity (IEC). By way of comparison, Nafion® typically has a ion exchange capacity of 0.9 meq per gram. In the present invention, it is preferred that the IEC be between 0.9 and 3.0 meq per gram, more preferably between 1.0 and 2.5 meq per gram, and most preferably between 1.6 and 2.2 meq per gram. In a preferred embodiment, a is 0.7 and b is 0.3.

Polymer membranes may be fabricated by solution casting of the ion-conductive copolymer. Alternatively, the polymer membrane may be fabricated by solution casting the ion-conducting polymer the blend of the acid and basic polymer.

When cast into a membrane for use in a fuel cell, it is preferred that the membrane thickness be between 0.1 to 10 mils, more preferably between 0.25 and 6 mils, most preferably less than 2.5 mils, and it can be coated over polymer substrate.

As used herein, a membrane is permeable to protons if the proton flux is greater than approximately 0.005 S/cm, more preferably greater than 0.01 S/cm, most preferably greater than 0.02 S/cm.

As used herein, a membrane is substantially impermeable to methanol if the methanol transport across a membrane having a given thickness is less than the transfer of methanol across a Nafion® membrane of the same thickness. In preferred embodiments the permeability of methanol is preferably 50% less than that of a Nafion® membrane, more preferably 75% less and most preferably greater than 80% less as compared to the Nafion® membrane.

After the ion-conducting copolymer has been formed into a membrane, it may be used to produce a catalyst coated membrane (CCM). As used herein, a CCM comprises a PEM when at least one side and preferably both of the opposing sides of the PEM are partially or completely coated with catalyst. The catalyst is preferable a layer made of catalyst and ionomer. Preferred catalysts are Pt and Pt—Ru. Preferred ionomers include Nafion and other ion-conductive polymers.

In general, anode and cathode catalysts are applied onto the membrane using well established standard techniques. For direct methanol fuel cells, platinum/ruthenium catalyst is typically used on the anode side while platinum catalyst is applied on the cathode side. For hydrogen/air or hydrogen/oxygen fuel cells platinum is generally applied on the anode and cathode sides. Catalysts may be optionally supported on carbon on either or both sides. The catalyst is initially dispersed in a small amount of water (about 100 mg of catalyst in 1 g of water). To this dispersion a 5% ionomer solution in water/alcohol is added (0.25-0.75 g). The resulting dispersion may be directly painted onto the polymer membrane. Alternatively, isopropanol (1-3 g) is added and the dispersion is directly sprayed onto the membrane. The catalyst may also be applied onto the membrane by decal transfer, as described in the open literature (Electrochimica Acta, 40: 297 (1995)).

Alternatively, the catalyst and ionomer can be applied to either or both of anode and cathode structures directly, and these can be bonded to the PEM using heat and pressure to form and MEA. The catalysts and ionomers are chosen for their intended function on either the anode or cathode and may be applied as described previously.

Depending upon the particular use of a fuel cell, a number of cells can be combined to achieve appropriate voltage and power output. Such applications include electrical power sources for residential, industrial, commercial power systems and for use in locomotive power such as in automobiles. Other uses to which the invention finds particular use includes the use of fuel cells in portable electronic devices such as cell phones and other telecommunication devices, video and audio consumer electronics equipment, computer laptops, computer notebooks, personal digital assistants and other computing devices, GPS devices and the like. In addition, the fuel cells may be stacked to increase voltage and current capacity for use in high power applications such as industrial and residential sewer services or used to provide locomotion to vehicles. Such fuel cell structures include those disclosed in U.S. Pat. Nos. 6,416,895, 6,413,664, 6,106,964, 5,840,438, 5,773,160, 5,750,281, 5,547,776, 5,527,363, 5,521,018, 5,514,487, 5,482,680, 5,432,021, 5,382,478, 5,300,370, 5,252,410 and 5,230,966.

Such CCM and MEA's are generally useful in fuel cells such as those disclosed in U.S. Pat. Nos. 5,945,231, 5,773,162, 5,992,008, 5,723,229, 6,057,051, 5,976,725, 5,789,093, 4,612,261, 4,407,905, 4,629,664, 4,562,123, 4,789,917, 4,446,210, 4,390,603, 6,110,613, 6,020,083, 5,480,735, 4,851,377, 4,420,544, 5,759,712, 5,807,412, 5,670,266, 5,916,699, 5,693,434, 5,688,613, 5,688,614, each of which is expressly incorporated herein by reference.

The CCM's and MEA's of the invention may also be used in hydrogen fuel cells that are known in the art. Examples include U.S. Pat. Nos. 6,630,259; 6,617,066; 6,602,920; 6,602,627; 6,568,633; 6,544,679; 6,536,551; 6,506,510; 6,497,974, 6,321,145; 6,195,999; 5,984,235; 5,759,712; 5,509,942; and 5,458,989 each of which are expressly incorporated herein by reference.

Example 1

(a) LWB/GDB Layer Ink for Cathode

Various methods may be used to prepare the cathode. In one embodiment, a cathode was formed using a barrier layer ink applied to a gas diffusion layer, such as carbon fiber paper, which resulted in a barrier layer which had both the target properties of the liquid water barrier layer and the gas diffusion barrier layer. The following outlines one process of making a LWB/GDB layer ink. However those skilled in the art could use alternative methods and materials.

Surfactant was used to suspend non-polar graphite particles in (polar) aqueous solution. The graphite mixture was sonicated to make sure that agglomerates of particles were broken apart. Teflon® and Hydroxyethylcellulose were added after sonication since the properties of both compounds are potentially altered during sonication.

50.0 g of 3% solution of TMN-100 surfactant solution (preferably made by mixing ~250 g water with ~7.73 g Tergitol® TMN-100 90% AQ solution) was combined with 14.03 g of Graphite. A clean spatula was used to crush the Graphite until the mixture was completely homogeneous. The mixture was placed in an ice bath and sonicated with a rod sonicator (e.g., Hielscher UP200S) for 3 minutes at 100% power, 70% duty cycle. After sonication, the mixture was removed from the ice bath.

A magnetic stir bar (e.g., ~3.75 cm long, mass=9 g) was added to the ink mixture. Teflon® (23.38 g) was added to the mixture by decanting from a 500 ml jar. The mixture was stirred on a magnetic stir plate, for 5 minutes. Natrosol® (0.254 g) was added such that a fine dust of Natrosol® fell into the ink. The ink was stirred for a minimum of 30 min before use.

(b) Application of Ink to a Gas Diffusion Layer Paper

The following is an example of the application of the cathode ink to bare Carbon Fiber Paper (CFP). Other methods such as screen printing or knife coating may be used to apply inks to porous GDL materials such as CFP A GDL (e.g., SGL 24BA) carbon fiber paper was cut to a standard sample size and weighed.

The ink was applied to the GDL strips in heavy coats using a synthetic bristle brush. The coats were applied uniformly, with light pressure on the brush. SGL 24BA carbon paper is very porous, and the first coat of ink will typically "bleed through" the CFP onto the painting surface. After samples on a board received one coat each, they were transferred to a convection oven set to 70° C. for a minimum of 6 minutes.

The above one coat step was repeated three more times, so each sample has a total of four coats of ink. The samples were placed in a 70° C. oven for drying between each coat. The samples were then transferred to stainless steel shelves in the high temperature convection oven for decomposition and sintering.

After the samples were in the oven, the temperature was ramped up to 300° C., and held at 300° C. for 30 min. The temperature was then ramped up to 350° C. and held at 350° C. for 15 min. The temperature was than ramped down to around 50° C. and the samples were removed. The samples have ~10 mg/cm$^2$ ink loading.

The decomposition/sintering procedure was repeated.

Example 2

The following fuel cell was constructed and tested over 500 hours.

The Cell Design included:
(1) A Fuel Cell Technologies Single Cell, 26 cm$^2$ active area;
(2) A PolyFuel DM-2-20-HB membrane;
(3) A cathode made as described in Example 1 with a catalyst layer: JM HiSpec 9000 catalyst at 1.62 mg/cm2 Pt loading; and
(4) An anode: JMFC Anode P/N ELE0069

The Operating Conditions were 150 mA/cm2; 50 C, Fuel 1M Methanol solution at 1.8 ml/min; Air flow 2 standard liters per minute; Daily shut-down 30 min every 12 hours.

FIG. 6 shows that the performance of a passive water recovery MEA is sufficient for use in practical fuel cell devices. FIG. 7 shows that such performance features remain stable for more than 500 hours, the duration of the test. The water transport rate, measured on the right hand vertical axis, remains stable as does the cell high frequency resistance (HFR). The cell comprises a PEM with 2 micron laser drilled holes spaced every 2 millimeters. The net water transport rate from the cathode, measured as a ratio of water leaving to water generated in the electrochemical reaction, was 0.65, which provides sufficient passive water recovery to enable the anode reaction and any additional water losses from the anode fuel loop including the electro-osmotic drag of water from the anode to cathode in conjunction with the protons.

What is claimed is:

1. A fuel cell comprising a polymer electrolyte membrane (PEM) having opposing cathode and anode surfaces and a liquid water barrier (LWB) layer disposed on the cathode side of said PEM, wherein said LWB layer comprises hydrophobic pores, is electrically conductive, allows the diffusion of oxygen gas across said layer and resists the flow of liquid water and wherein said PEM comprises:

(i) passages at predetermined positions across said PEM;
(ii) passages having an effective hydraulic diameter of 1 to 25 microns that extend from said cathode surface to said anode surface;
(iii) passages that extend from said cathode surface to said anode surface that are substantially perpendicular to said anode;
(iv) passages that extend from said cathode surface to said anode surface that are spaced approximately 0.1-20 millimeters from each other;
(v) a high water permeation aspect and a low water permeation aspect, wherein said high water permeation aspect comprises integral flow passages between said opposing surfaces; or (vi) holes that extend from said cathode surface to said anode surface;

said fuel cell further comprising a liquid water distribution (LWD) layer comprising hydrophobic pores, where said LWD layer is electrically conductive and allows the flow of liquid water through or across said LWD layer.

2. The fuel cell of claim 1 further comprising a gas diffusion barrier (GDB) layer, where said GDB layer comprises hydrophobic pores, is optionally electrically conductive, allows the diffusion of oxygen gas and resists the flow of water vapor across said GDB layer.

3. The fuel cell of claim 1 wherein said LWD layer comprises a cathode catalyst layer.

4. The fuel cell of claim 1 further comprising a gas diffusion layer (GDL) where said GDL is optionally electrically conductive and allows the flow of gases across said GDL.

5. The fuel cell of claim 1 further comprising;

(a) a gas diffusion barrier (GDB) layer, where said GDB layer comprises hydrophobic pores, is optionally electrically conductive, allows the diffusion of oxygen gas and resists the flow of water vapor across said GDB layer; and (b) a gas diffusion layer (GDL) where said GDL is optionally electrically conductive and allows the flow of gases across said GDL layer.

6. The fuel cell of claim 2 wherein said LWD layer comprises a cathode catalyst layer.

* * * * *